(12) United States Patent
Bourse et al.

(10) Patent No.: US 10,574,159 B2
(45) Date of Patent: Feb. 25, 2020

(54) METHOD FOR CONTROLLING A SYNCHRONOUS MACHINE WITH PERMANENT MAGNETS AND CORRESPONDING DEVICE

(71) Applicant: SAFRAN ELECTRICAL & POWER, Blagnac (FR)

(72) Inventors: Wenceslas Bourse, Beauzelle (FR); Guillaume Boulet, L'isle Jourdain (FR); Pascal Rollin, Daux (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 0 days.

(21) Appl. No.: 15/777,933

(22) PCT Filed: Nov. 22, 2016

(86) PCT No.: PCT/FR2016/053049
§ 371 (c)(1),
(2) Date: May 22, 2018

(87) PCT Pub. No.: WO2017/089697
PCT Pub. Date: Jun. 1, 2017

(65) Prior Publication Data
US 2018/0351487 A1    Dec. 6, 2018

(30) Foreign Application Priority Data

Nov. 23, 2015 (FR) ..................................... 15 61249

(51) Int. Cl.
*H02P 6/28* (2016.01)
*F04D 25/06* (2006.01)
(Continued)

(52) U.S. Cl.
CPC ................ *H02P 6/10* (2013.01); *F04D 25/06* (2013.01); *F04D 27/004* (2013.01); *H02P 6/16* (2013.01); *H02P 6/28* (2016.02); *H02P 21/09* (2016.02)

(58) Field of Classification Search
CPC ........... H02P 6/16; F04D 25/06; F04D 27/004
See application file for complete search history.

(56) References Cited

U.S. PATENT DOCUMENTS 6,137,251 A * 10/2000 Huang .................... H02P 6/085
                                                         318/400.11
6,433,503 B1 * 8/2002 Uematsu ................ H02K 29/08
                                                         318/280

(Continued)

OTHER PUBLICATIONS

International Search Report dated Feb. 22, 2017, in PCT/FR2016/053049, filed Nov. 22, 2016.

(Continued)

*Primary Examiner* — Eduardo Colon Santana
*Assistant Examiner* — Said Bouziane
(74) *Attorney, Agent, or Firm* — Oblon, McClelland, Maier & Neustadt, L.L.P.

(57) ABSTRACT

A permanent magnet synchronous machine includes a permanent magnet rotor and a three-phase stator, the machine being associated with a control inverter for controlling the stator of the machine. A method of controlling the machine includes taking three simultaneous measurements by three respective Hall effect sensors arranged to have a central sensor and two lateral sensors, the two lateral sensors being placed at 120°/p mechanical relative to the central sensor about the rotation axis of the rotor, where p is the number of pairs of poles of the machine; determining the position of the rotor based on the three measurements; controlling the control inverter as a function of the determined position of the rotor; and prior to controlling the inverter, applying a (Continued)

time delay to the three measurement signals so that the control of the control inverter takes account of a variable desired lag angle.

9 Claims, 2 Drawing Sheets

(51) Int. Cl.
*F04D 27/00* (2006.01)
*H02P 6/16* (2016.01)
*H02P 6/10* (2006.01)
*H02P 21/09* (2016.01)

(56) References Cited

U.S. PATENT DOCUMENTS

2010/0315029 A1 12/2010 Kern et al.
2014/0324230 A1* 10/2014 Zhao ................. F24F 11/89
700/276

OTHER PUBLICATIONS

Kim, S. et al., "An Improved Rotor Position Estimation With Vector-Tracking Observer in PMSM Drives With Low-Resolution Hall-Effect Sensors", IEEE Transactions on Industrial Electronics, vol. 58, No. 9, XP 011383127, Sep. 2011, pp. 4078-4086.

* cited by examiner

METHOD FOR CONTROLLING A SYNCHRONOUS MACHINE WITH PERMANENT MAGNETS AND CORRESPONDING DEVICE

BACKGROUND OF THE INVENTION

The invention relates to the general field of permanent magnet synchronous machines, and more particularly to controlling permanent magnet synchronous machines for variable-speed fans.

Variable-speed fans generally include an inverter and a motor that is a permanent magnet synchronous machine. Permanent magnet synchronous machines are generally powered by means of a direct current (DC) power supply via the inverter arranged between the DC power supply and the permanent magnet synchronous machine.

To control a permanent magnet synchronous machine, i.e. to enable the motor to be controlled automatically, it is necessary to have information about the position of its rotor.

Various methods of controlling the inverter of the motor already exist, with the most common being as follows:
  sinewave type control of the inverter of the motor, which requires continuous information at high resolution about the position of the rotor; and
  square wave type control of the inverter of the motor or indeed 120° or "trapezoidal" type control, for which information about the position of the rotor need only be discrete and at low resolution.

Trapezoidal control, also known as "120°" control, uses three Hall effect sensors to detect the angular position of the rotor in six positions. The three sensors serve to subdivide one electrical period of the rotor having a duration of 360° electrical, discretely into six electrical sectors each of 60° electrical. Trapezoidal control presents six operating points, each corresponding to one angular sector of the rotor. Knowing the angular sector in which the permanent magnet(s) of the rotor is/are located, the inverter powers the two appropriate phases of the stator of the synchronous machine for obtaining motor torque.

More precisely, the three Hall sensors are positioned on the stator of the motor so as to be spaced apart by 120° electrical, i.e. 60° mechanical for a motor having two pairs of electrical poles, as shown in FIG. 1, which gives an example arrangement for Hall effect sensors C1, C2, and C3 for a motor having four electrical poles A1 to A4, A1 and A3 being north magnetic poles and A2 and A4 being south magnetic poles.

The Hall effect sensors are sensitive to the polarity of the magnets of the rotor. Each sensor delivers a logic signal, which may have a "high" first value if the north magnet is facing the sensor, or else a "low" second value if the south magnet of polarity opposite to the north magnet is facing the sensor.

With the information delivered by these three Hall effect sensors, it is possible to reconstitute the position of the motor by creating electrical sectors of 60° electrical corresponding to various combinations of the three signals delivered by the sensors, as shown in FIG. 2. FIG. 2 is a graph plotting signals from the three Hall effect sensors C1 to C3 for the FIG. 1 motor having four electrical poles, i.e. two pairs of electrical poles, in which figure each vertical dashed line lies between two electrical sectors of 60° electrical.

Depending on the electrical sector, two switches of the inverter are controlled so as to cause current to flow that serves to provide motor torque. Such control is referred to as "120°" control.

The operation of an electric motor under 120° control can be represented by a so-called "Fresnel" diagram as shown in FIG. 3, where V is the voltage applied by the inverter to the terminals of the synchronous machine, E is the electromotive force (ems) of the synchronous machine, which is proportional to its speed of rotation, I is the current in a motor phase, R is the resistance of the winding of the motor, L is the inductance of the motor, and ω is the electrical angular frequency of the motor, given that ω can be expressed as a function of the electrical frequency of rotation of the motor in application of the equation $\omega=2\pi f$.

The phase difference corresponding to the angle between the voltage V applied by the inverter and the emf E of the motor is referred to as δ, also known as the "lag" angle.

The lag angle δ can be controlled since the phase of the emf E is deduced from the information delivered by the Hall effect sensors and the phase of the voltage V is determined by the control of the inverter.

This lag angle δ may be selected so as to maximize torque. Under such circumstances, the emf E and the current I in a phase of the motor are in-phase, as shown in the Fresnel diagram of FIG. 4.

In various fans, it is known to determine, i.e. impose, the lag angle δ of a synchronous motor mechanically by offsetting the positioning of the Hall effect sensors relative to the axes of the coils B1 to B3 of the phases of the motor, as shown in FIG. 5. The inverter thus receives information from the sensors and changes its control signals as soon as a change of sector is detected.

Since the lag angle δ is determined mechanically, various mechanical tolerances will lead to inaccuracy in this angle, which inaccuracy increases when the diameter of the motor is small. Usually, dispersion in the lag angle δ is found to lie in the range ±5° for a lag angle of 15° electrical.

Unfortunately, it is necessary to have good accuracy for this lag angle for the motor-and-inverter combination to act in repetitive manner, in particular from the points of view of efficiency, harmonics, and performance.

Specifically, the value of the lag angle δ has multiple consequences on the performance of the inverter-and-motor combination. Firstly, concerning the appearance of currents flowing in the phases of the motor, the harmonic spectrum of the current in the phases is rich to a greater or lesser extent, giving rise to greater or lesser ripple in the torque of the motor. The lag angle δ also has an influence on the efficiency of power conversion (active power and reactive power) and also on the harmonic spectra rejected into the network.

Inaccuracy concerning the lag angle thus has an immediate impact on the reproducibility of the performance of the fan.

In order to obtain and maintain the desired accuracy, there are generally two main problems that are encountered.

The first problem, which is already mentioned above, comes from the fact that the various tolerances concerning the positioning of the mechanical parts relative to one another give rise to a tolerance concerning the lag angle δ that is very large, particularly when the diameter of the motor is small.

The second major problem stems from the fact that the lag angle δ is set mechanically, which means that it is optimized for only one operating point of the motor, which generally corresponds to the operating point at which the consumption of the fan is at a maximum.

With a constant lag angle δ it is not possible for the performance of the combination formed by the inverter and the motor to be optimized for all of the operating points of a synchronous motor, and in particular the motor of a fan.

Specifically, the modulus of the emf E varies linearly as a function of speed, whereas, and by way of example, for a synchronous motor of a fan, the modulus of the motor current varies with the square of the speed.

This second problem associated with optimizing the lag angle on a single operating point of the synchronous motor can lead to excess consumption by the motor at other operating points. This phenomenon is made correspondingly worse when the power of the motor increases.

OBJECT AND SUMMARY OF THE INVENTION

The invention seeks to provide a method of controlling a permanent magnet synchronous machine that enables better performance to be obtained for the inverter-and-motor combination at all operating points of the synchronous machine.

In an implementation, the invention provides a method of controlling a permanent magnet synchronous machine having a permanent magnet rotor and a three-phase stator, the machine being associated with a control inverter for controlling the stator of the synchronous machine, and the method comprising:

taking three simultaneous measurements by three respective Hall effect sensors, the three sensors being arranged in such a manner as to have a central sensor and two lateral sensors, the two lateral sensors being placed at 120°/p mechanical relative to the central sensor about the axis of rotation of the motor, where p is the number of pairs of poles of the synchronous machine;

determining the position of the rotor on the basis of said three measurements; and controlling the control inverter as a function of the determined position of the rotor.

According to a general characteristic of the invention, prior to controlling the inverter, the method comprises applying a time delay to the three measurement signals so that the control of the control inverter takes account of a variable desired lag angle.

Thus, for a synchronous machine having two pairs of electrical poles, the three Hall effect sensors are spaced apart at 60° mechanical, since 120°/2=60°.

Generating and applying an adjustable delay when processing the information from the Hall effect sensors makes it possible to vary the lag angle as a function of the operating point of the motor, i.e. to vary the lag of the synchronous machine dynamically, so as to have an optimum lag angle at all times. The proposed solution thus makes it possible to control the lag angle, not mechanically but rather in analog or digital manner on the basis of the measurement signals and of processor means such as software means, so as to improve the reproducibility of performance.

In a first aspect of the control method, the value of the delay that is applied depends on the speed of rotation of the rotor of the synchronous machine.

The emf developed by the synchronous machine varies linearly with the speed of rotation of the rotor, whereas the modulus of the current powering the coils of the stator varies as a function of the square of the speed of rotation of the rotor. Adjusting the value of the delay for each speed value thus makes it possible to conserve an optimum lag angle so as to obtain the best performance for the combination formed by the control inverter and the synchronous machine, regardless of the speed of the rotor of the synchronous machine.

In a second aspect of the control method, the three measurements taken by the Hall effect sensors are preferably taken in advance relative to the axes of the coils of the phases of the stator of the synchronous machine.

Taking measurements in advance relative to the axes of the stator coils thus makes it possible to be able to introduce the necessary delay in the control relationship for the control inverter.

In a third aspect of the control method, it is possible for the values, in seconds, of the delay to be applied for each value of the speed of rotation of the synchronous machine to be calculated beforehand using the following equation:

$$\text{Delay} = (\delta_{initial} - \delta_{desired})\frac{P}{360}$$

where $\delta_{initial}$ is the angle between the Hall effect sensors and the axes of the coils of the motor expressed in degrees, $\delta_{desired}$ is the desired lag angle expressed in degrees, and P is the electrical period expressed in seconds.

In a fourth aspect of the control method, and in a variant of the third aspect of the method, it is possible beforehand to determine empirically the values of the delay to be applied for each speed of rotation of the synchronous machine beforehand on the basis of measurements taken on a test bench of the inlet current of the inverter, of the inlet voltage of the inverter, and of the speed of the synchronous machine.

The delay is thus determined in automatic and optimized manner on the basis of measuring the power and/or the harmonics of the power consumption at the inlet of the control inverter or of the synchronous machine.

The measurements of power and/or harmonics may be taken either using measurement instruments, or else using measurement means available on the control inverter. Thus, during acceptance testing of the product, a plurality of lag angles can be tested so as to find the angle that makes it possible to satisfy the criteria required concerning power and/or harmonics at the inlet of the control inverter or of the synchronous machine.

Thus, for various speeds of the synchronous machine that are characteristic of its future application, the lag angle can be modified until it satisfies acceptance criteria, which acceptance criteria may be:

minimizing power consumption at the inlet of the inverter (criteria concerning electrical power); or minimizing the rejection of harmonics into the network (criterion concerning the level of harmonic distortion on the current of the DC bus); or a compromise between both criteria.

In a fifth aspect of the control method, the method may include selecting the value of the delay as a function of the speed of rotation of the synchronous machine, the selection being made on the basis of a table of delay values as a function of the speed of rotation of the synchronous machine stored in a memory.

The invention also provides a control system for control of a permanent magnet synchronous machine having a permanent magnet rotor and a three-phase stator, the machine being associated with a control inverter for controlling the stator of the synchronous machine, and the system including three Hall effect sensors and control means coupled to the outlets of said sensors and configured to receive the three measurement signals taken simultaneously by the sensors, the three Hall effect sensors being mounted on the synchronous motor so as to have a central sensor and two lateral sensors, the two lateral sensors being placed at 120°/p mechanical relative to the central sensor about the axis of rotation of the motor, p being the number of pairs of poles of the synchronous machine, and the control means being configured to determine the position of the rotor on the basis of said three measurements and to control the control inverter as a function of the determined position of the rotor.

According to a general characteristic of this system, the control means comprise a signal processor module suitable for applying a time delay, i.e. a time phase difference, to the three measurement signals so that the control of the control inverter takes account of a variable desired lag angle.

In a first aspect of the control system, the stator has coils, and each of the three Hall effect sensors is positioned in advance relative to the axis of a respective one of the coils of the phases of the stator of the synchronous machine.

In a second aspect of the control system, including a memory suitable for storing a table of delay values as a function of the speed of rotation of the synchronous machine, the control means including a selector module suitable for selecting the delay value to be applied as a function of the speed of rotation of the motor.

The invention also provides a variable speed fan including a permanent magnet synchronous machine and a control inverter associated with the synchronous machine and including a control system as defined above.

BRIEF DESCRIPTION OF THE DRAWINGS

The invention can be better understood on reading the following description given by way of non-limiting indication and with reference to the accompanying drawings, in which.

DETAILED DESCRIPTION OF IMPLEMENTATIONS

Figure 1:
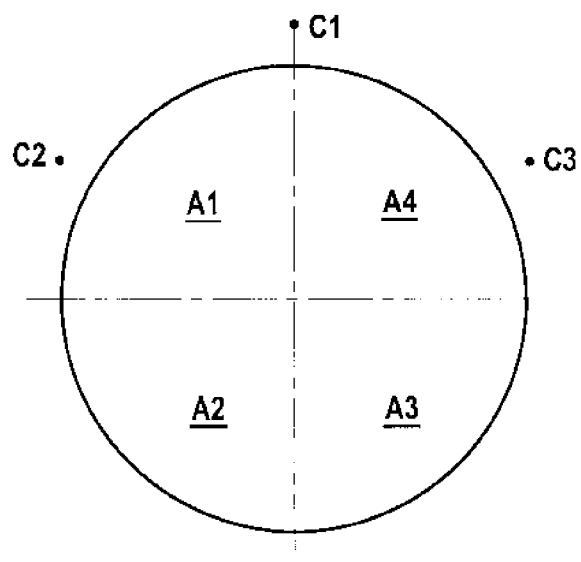
FIG. 1, described above, shows an example arrangement of Hall effect sensors for a motor having four electrical poles.
Figure 2:
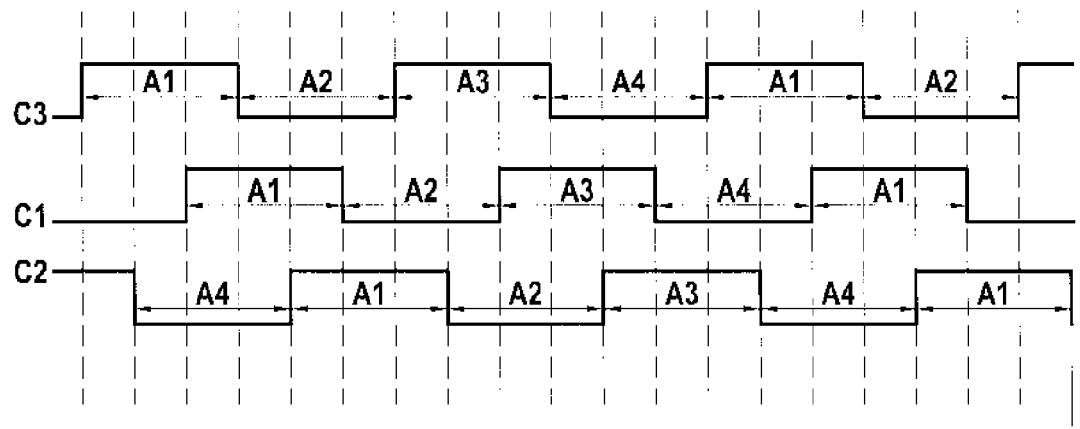
FIG. 2, described above, is a graph showing the signals from the Hall effect sensors for the FIG. 1 four-pole motor.
Figure 3:
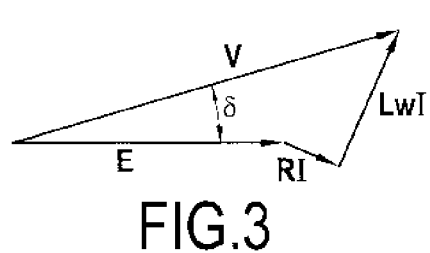
FIG. 3, described above, is a Fresnel diagram for a permanent magnet synchronous machine.
Figure 4:
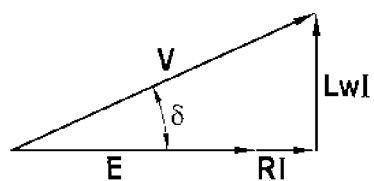
FIG. 4, described above, is a Fresnel diagram for a permanent magnet synchronous machine for which the lag angle is optimized in order to eliminate the phase difference between the power supply current delivered to the synchronous motor by the inverter and the emf delivered by the synchronous machine.
Figure 5:
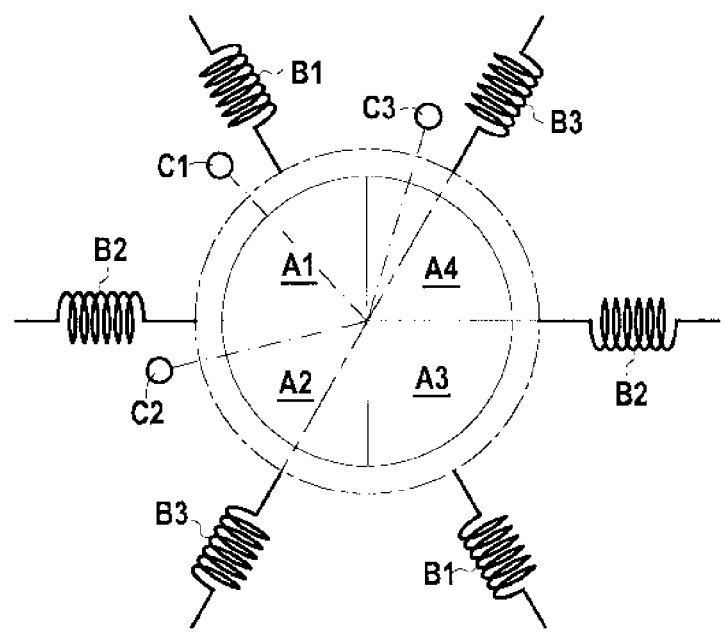
FIG. 5, described above, is a diagram showing the configuration of a prior art synchronous machine having Hall effect sensors positioned so as to determine the lag angle mechanically.
Figure 6:
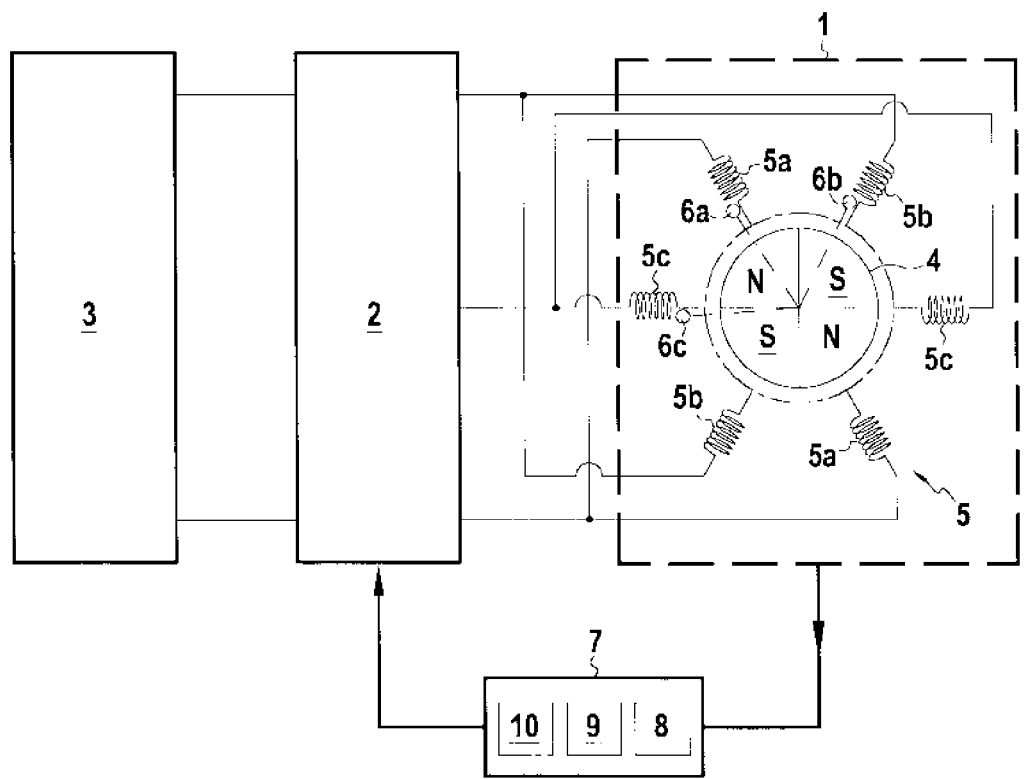
FIG. 6 is a diagram showing a permanent magnet synchronous machine having a system for controlling the machine in accordance with an implementation of the invention.

FIG. 6 is a diagram showing a permanent magnet synchronous machine provided with a system for controlling the machine in accordance with an implementation of the invention.

The permanent magnet synchronous machine 1 is controlled by an inverter 2 having its inlet coupled to a power supply 3.

In this example, the inverter 2 is a three-phase inverter having three top arms and three bottom arms. Each arm of the inverter has at least one switch, e.g. an insulated grid bipolar transistor.

The synchronous machine 1 has a four-pole permanent magnet rotor 4, made up of two north poles N and two south poles S, and also a stator 5 having three phases, each associated with a respective arm of the inverter 2, each phase having two diametrically opposite windings 5a, 5b or 5c.

The angular sectors of the rotor 4 are defined by the six windings 5a, 5b, 5c of the stator. Each arm of the inverter 2 is associated with an angular sector of the rotor 4, so that the rotor 4 thus travels through six sectors.

In order to determine the angular sector in which the rotor 4 is present, Hall effect sensors 6a, 6b, and 6c are used, each arranged at 120° electrical relative to the others, i.e. at 60° mechanical. These sensors 6a to 6c can determine when the rotor 4 enters a sector.

In order to control the switches of the inverter 2, a control system is provided with the Hall effect sensors 6a, 6b, and 6c, and with a control device 7 connected to the inverter 2. The control device 7 may be implemented with onboard calculation means, e.g. within a programmable microcircuit of the field programmable gate array (FPGA) type.

The device 7 is connected to the Hall effect sensors 6a, 6b, and 6c that are mounted on the synchronous machine 1, and it is configured to recover the measurement signals delivered by the Hall effect sensors 6a to 6c concerning the position of the rotor 4.

The control device 7 has a signal processor module 8 suitable for applying a time delay, i.e. a time phase difference to the three measurement signals so that the control inverter is controlled in a manner that takes account of a desired variable lag angle, in particular as a function of the operating speed of the synchronous machine 1, i.e. as a function of the speed of rotation of the rotor 4.

In order to able to apply a delay to the measurement signals from the Hall effect sensors 6a to 6c, each of the three Hall effect sensors 6a to 6c is positioned in advance relative to the direction of rotation of the rotor 4 and relative to the axis of one of the coils 5a, 5b, 5c of the phases of the stator 5 of the synchronous machine 1. In other words, for rotation of the rotor 4 in the clockwise direction, the radius formed between the axis of rotation of the rotor 4 and one of the Hall effect sensors, e.g. 6a, is offset relative to the axis formed by the axis of rotation of the rotor 4 and the coil 5a with which the sensor is associated by a certain angle in the counterclockwise direction.

In order to optimize the control of the synchronous machine 1 by using the control inverter 2, three simultaneous measurements are taken by the three Hall effect sensors 6a to 6c. The measurement signals are delivered to the control device 7 so that it determines the position of the rotor 4 on the basis of said three measurements.

Before determining the position of the rotor 4, the signal processor module 8 applies an angular phase difference to each of the received signals, which phase difference corresponds to a time delay of value that depends on the value of the speed of rotation of the rotor 4. The applied time phase difference thus serves to modify the control of the control inverter 2 as a function of a desired lag angle. Since the lag angle can be modified as a function of the speed of rotation of the rotor 4, it is possible at all times to control the control inverter 2 of the synchronous machine under optimum conditions.

The delay values that are to be applied as a function of speed are determined during a prior stage of setting up the synchronous machine, either on a test bench on the basis of measuring currents at the inlet of the inverter, voltage at the inlet of the inverter, and speed of the synchronous motor, or else on the basis of prior calculations performed using the following equation that gives, in seconds, delay values to be applied for each value of the speed of rotation of the synchronous machine:

$$\text{Delay} = (\delta_{initial} - \delta_{desired})\frac{P}{360}$$

where $\delta_{initial}$ is the angle between the Hall effect sensors and the axes of the motor coils expressed in degrees, $\delta_{desired}$ is the desired lag angle expressed in degrees, and P is the electrical period expressed in seconds.

The control device 7 also has a memory 9 configured to store a table of delay values as determined in this way as a function of the speed of rotation of the synchronous machine 1.

In a variant, the memory 9 could be external to the control device 7.

The control device 7 also has a selector module 10 that serves while the synchronous machine 1 is in operation to select the value of the delay to be applied to the received measurement signals as a function of the speed of rotation of the rotor 4 in order to control the control inverter 2 in such a manner as to obtain optimum efficiency.

The invention claimed is:

1. A 120° control method of controlling a permanent magnet synchronous machine having a permanent magnet rotor and a three-phase stator, the machine being associated with a control inverter for controlling the stator of the synchronous machine, and the method comprising:
    taking three simultaneous measurements by three respective Hall effect sensors, the three sensors being arranged to have a central sensor and two lateral sensors, the two lateral sensors being placed at a mechanical angle of 120°/p away from the central sensor relative to an axis of rotation of the rotor of the synchronous machine, where p is a number of pairs of poles of the synchronous machine;
    determining a position of the rotor based on said three measurements; and
    controlling the control inverter as a function of the determined position of the rotor;
    wherein, prior to controlling the inverter, a time delay is applied to three measurement signals from the Hall effect sensors so that the control of the control inverter takes account of a variable desired lag angle, and
    wherein, values, in seconds, of the delay to be applied for each value of a speed of rotation of the synchronous machine are calculated beforehand using the following equation:

$$\text{Delay} = (\delta_{initial} - \delta_{desired})\frac{P}{360}$$

where $\delta_{initial}$ is an angle between the Hall effect sensors and axes of coils of the synchronous machine expressed in degrees, $\delta_{desired}$ is the desired lag angle expressed in degrees, and P is an electrical period expressed in seconds.

2. The method according to claim 1, wherein the value of the delay that is applied depends on a speed of rotation of the rotor of the synchronous machine.

3. The method according to claim 1, wherein the three measurements taken by the Hall effect sensors are taken in advance relative to axes of coils of the phases of the stator of the synchronous machine.

4. The method according to claim 1, wherein the values of the delay to be applied for each speed of rotation of the synchronous machine are determined empirically beforehand based on measurements taken on a test bench of an inlet current of the inverter, of an inlet voltage of the inverter, and of the speed of rotation of the synchronous machine.

5. The method according to claim 1, further comprising selecting the value of the delay as a function of the speed of rotation of the synchronous machine, the selection being made based on a table of delay values as a function of the speed of rotation of the synchronous machine stored in a memory.

6. A 120° control system for controlling a permanent magnet synchronous machine having a permanent magnet rotor and a three-phase stator, the machine being associated with a control inverter for controlling the stator of the synchronous machine, and the system comprising:
    three Hall effect sensors; and
    control means coupled to outlets of said Hall effect sensors and configured to receive three measurement signals taken simultaneously by the sensors, the three Hall effect sensors being mounted on the synchronous motor so as to have a central sensor and two lateral sensors, the two lateral sensors being placed at a mechanical angle of 120°/p away from the central sensor relative to an axis of rotation of the synchronous machine, p being a number of pairs of poles of the synchronous machine,
    wherein the control means comprise a signal processor module suitable for applying a time delay to the three measurement signals so that control of the control inverter takes account of a variable desired lag angle, and
    wherein, values, in seconds, of the delay to be applied for each value of a speed of rotation of the synchronous machine are calculated beforehand using the following equation:

$$\text{Delay} = (\delta_{initial} - \delta_{desired})\frac{P}{360}$$

where $\delta_{initial}$ is an angle between the Hall effect sensors and axes of coils of the synchronous machine expressed in degrees, $\delta_{desired}$ is the desired lag angle expressed in degrees, and P is an electrical period expressed in seconds.

7. The control system according to claim 6, wherein the stator has coils and each of the three Hall effect sensors is positioned in advance relative to an axis of a respective one of the coils of the phases of the stator of the synchronous machine.

8. The control system according to claim 6, comprising a memory suitable for storing a table of delay values as a function of the speed of rotation of the synchronous machine, the control means comprising a selector module suitable for selecting the delay value to be applied as a function of the speed of rotation of the synchronous machine.

9. A variable speed fan comprising:
a permanent magnet synchronous machine and a control inverter associated with the synchronous machine, wherein the fan comprises the control system according to claim 6.

* * * * *